United States Patent [19]
Vincent et al.

[11] Patent Number: 5,822,879
[45] Date of Patent: Oct. 20, 1998

[54] METHOD AND OVEN FOR HOMOGENEOUSLY MELTING BY MICROWAVES WITH OSCILLATION OF STATIONARY WAVES FOR VITRIFYING MATERIALS AND GAS OUTLET FLOW

[75] Inventors: Jean-Jacques Vincent, Bagnols sur Ceze; Jean-Marc Silve, Marseilles; René Cartier, Le Pontet; Hubert Frejaville, St. Martial, all of France

[73] Assignees: COMMISSARIAT a l'Energie Atomique, Paris; Compagnie General des Matieres Nucleaires, Velizy Villacoublay, both of France

[21] Appl. No.: 834,253

[22] Filed: Apr. 15, 1997

[30] Foreign Application Priority Data

Apr. 23, 1996 [FR] France ................................. 96 05084

[51] Int. Cl.⁶ ........................................... F26B 3/34
[52] U.S. Cl. ................................. 34/262; 34/265
[58] Field of Search ........................ 34/259, 262, 265, 34/169, 175, 177, 443, 487; 110/250; 219/629, 687, 693, 700, 730

[56] References Cited

U.S. PATENT DOCUMENTS 5,254,818  10/1993  Aubert ................................. 219/687
5,540,886  7/1996  Warmbier et al. ................... 422/21
5,597,504  1/1997  Berson et al. ....................... 219/693

FOREIGN PATENT DOCUMENTS 507 668  10/1992  European Pat. Off. .
57-202098  12/1982  Japan .

*Primary Examiner*—Henry A. Bennett
*Assistant Examiner*—Steve Gravini
*Attorney, Agent, or Firm*—Pearne, Gordon, McCoy & Granger LLP

[57] ABSTRACT

The method and oven of the invention are able to homogeneously and continuously melt about twelve kilograms of glass per hour.

A microwave oven is used with the wave being monomodal and with frequency of 915 MHz. Disposed opposite the entrance (15) of the microwaves is a piston (20) continuously oscillating so as to constantly make the position of the reflection surface (21) of the electromagnetic waves vary. Thus, all the points of the melting bath surface (9) are heated.

Application for the vitrification of radioactive and toxic waste.

8 Claims, 3 Drawing Sheets

METHOD AND OVEN FOR HOMOGENEOUSLY MELTING BY MICROWAVES WITH OSCILLATION OF STATIONARY WAVES FOR VITRIFYING MATERIALS AND GAS OUTLET FLOW

FIELD OF THE INVENTION

The invention concerns the vitrification and <<ceramization>>, that is the placing in a vitroceramic form of mineral oxides by using microwaves. It is applicable more particularly to the vitrification of radioactive or toxic waste for their subsequent storage.

BACKGROUND OF THE INVENTION

The storage of toxic waste, such as radioactive waste, poses serious problems in relation to the environment. So as to avoid the dissemination of this type of material, a known and widely used solution consists of immobilizing this type of waste in materials able to resist different types of corrosion over a considerable period of time and vitrification is able to immobilize this waste in a stable form for an extremely long period. For example, this waste may be made up of glass fiber, asbestos, ceramic or incineration ash filters.

Concerning the sphere of microwaves, there are currently two types of vitrification methods, namely multimodal and monomodal methods. The multimodal methods are advantageous in that they can make use of a sufficiently large oven and thus sufficiently process waste for a profitable industrial installation functioning discontinuously. However, with this technique, the distribution of the electromagnetic fields is anarchic and non-uniform. The resultant heat treatment is heterogeneous with hot points where there is a risk of vaporization and cold points where the material risks being insufficiently transformed. The quality of the vitrified material obtained is therefore not constant, which is not admissible for toxic and radioactive materials, The monomodal method consists of operating with a microwave melting oven only allowing the sole fundamental mode of the selected wave to propagate. This method is described in the French patent application FR-A-2 674 939 filed by the SOCIETE GENERALE POUR LES TECHNIQUES NOUVELLES S.G.N. In this application and with reference to FIG. 1, the microwaves are introduced via an inlet 1 of a rectangular section tube so as to arrive in a tank 3 constituted by the base of a curved portion of the tube. The materials to be vitrified are introduced through an upper inlet 2 on the side of the inlet 1 of the tube where the microwave generator is placed. The carried incident wave partly arrives at the surface of the glass bath surface and is freed from the limitations of the surface of the bath imposed by oblique or perpendicular wave functionings. This oven has a double casing 4 cooled with water so as to solidify the glass in contact with the cold wall. This technique, known as the <<auto glass melting pot technique>>(the molten material is contained in its own casing), is able to be freed from any stresses linked to corrosion in that the molten glass is in no way in contact with the walls of the oven.

Finally, the oven is equipped with a piston 8 including a surface intended to reflect the incident wave not absorbed by the glass bath. This surface 7 requires a stationary wave state both magnetic and electric on the surface of the bath, the location of its nodes and electromagnetic antinodes being directly linked to the position of this surface 7. This is why the piston 8 is mounted sliding in the structure of the oven so as to be able to adjust this position of the surface 7.

The stationary state of the nodes and antinodes provokes the presence of permanent cold and hot zones on the surface of the glass bath. The distance which separates one hot point from a cold point is equal to $$\frac{\lambda g}{4},$$

$\lambda g$ being the guided wavelength. Thus, if a short wavelength is used, the heat minima and maxima are not too far apart and an acceptable homogenization of the temperatures is obtained by natural convection. This is the case when operation takes place at a frequency of 2450 MHz where the weak and strong fields are spaced by about 4 cm on standardized guide. At this frequency, it is possible to have several generators ranging up to 10 kW and which permit treatment capacities of between 2 and 3 kg/hr.

On the other hand, if it is desired to have a higher treatment capacity with flowrates of about twelve kg/hr, it is necessary to make use of more powerful microwave generators. It is then essential to use generators functioning at a frequency of 915 MHz. At this wavelength, the distance separating a hot point from a cold point is equal to $$9 \text{ cm} = \frac{\lambda g}{4}$$

and an alteration is then created on the surface of the glass bath of hot zones at 1100° C. and really cold zones at 500° to 600° C., namely a temperature gradient of more than 60° C./cm. These heat heterogeneities then become redhibitory for producing a containment glass for the radioactive waste. This solution is therefore unacceptable.

The object of the invention is to provide a technical solution to homogenize the glass bath temperatures and make it possible to produce a flowrate of 10 kg/hr of glass with a quality compatible with the containment requirements of radioactive waste.

SUMMARY OF THE INVENTION

One first object of the invention is therefore a method for melting by microwaves for vitrifying materials with the aid of a body including:
- a lower portion constituting a melting tank;
- a material feed orifice;
- an outlet for the melted materials placed at the height of the desired level of the surface of the melting bath thus functioning via overflowing;
- a gas outlet, and
- an inlet for microwaves intended to melt the materials continuously by the wave emitted by a microwave generator above the melting bath and by the stationary wave reflected by the reflecting surface placed in the body opposite the generator.

According to the invention, with the wave being monomodal, the method consists of continuously varying the position of the reflecting face so as to permanently vary the position of the antinodes of the stationary wave and thus homogenize the temperature of the entire melting bath.

In its main embodiment, the method uses a wavelength wave equal to 12 cm, that is a frequency of 915 MHz.

However, the method does give satisfactory results within a range of frequencies of between 300 MHz and 3 GHz.

A second main object of the invention is thus a microwave melting oven for vitrifying materials and comprising:
- a body including a lower portion constituting a melting tank with a constant section over the largest possible length, a inlet for materials, an outlet for the melted materials placed at the height of the desired level of the surface of the melting bath, a gas outlet, a microwave inlet, and a microwave reflecting surface situated on the side opposite that of the microwave inlet, and a microwave generator connected to the microwave inlet.

According to the invention, the oven includes motor means to permanently vary the distance separating the inlet and the reflection surface so as to constantly vary the position of the antinodes of the stationary wave on the surface of the glass bath.

In its main embodiment where the reflecting surface is a sliding mounted piston, the motor means are constituted by means to alternatively and permanently move the piston.

In this case where the body and piston have a rectangular section, these motor means include an electric motor;

a threaded rod driven in rotation by the electric motor;

a nut mounted on the threaded rod, and two bars connected to the nut and integral with the piston.

This device is advantageously completed by two end of travel inverters placed on the inner walls of the body in the portion where the piston is placed and a contact portion integral with the piston placed projecting so as to activate the inverters and thus control the alternative movement of the piston.

The microwave generator is advantageously completed by a system for damping the reflected wave.

BRIEF DESCRIPTION OF THE DRAWINGS

The invention and its technical characteristics shall be more readily understood from a reading of the following description of an embodiment of the invention illustrated by the following figures respectively representing.

DETAILED DESCRIPTION OF A PREFERRED EMBODIMENT OF THE INVENTION

Figure 1:
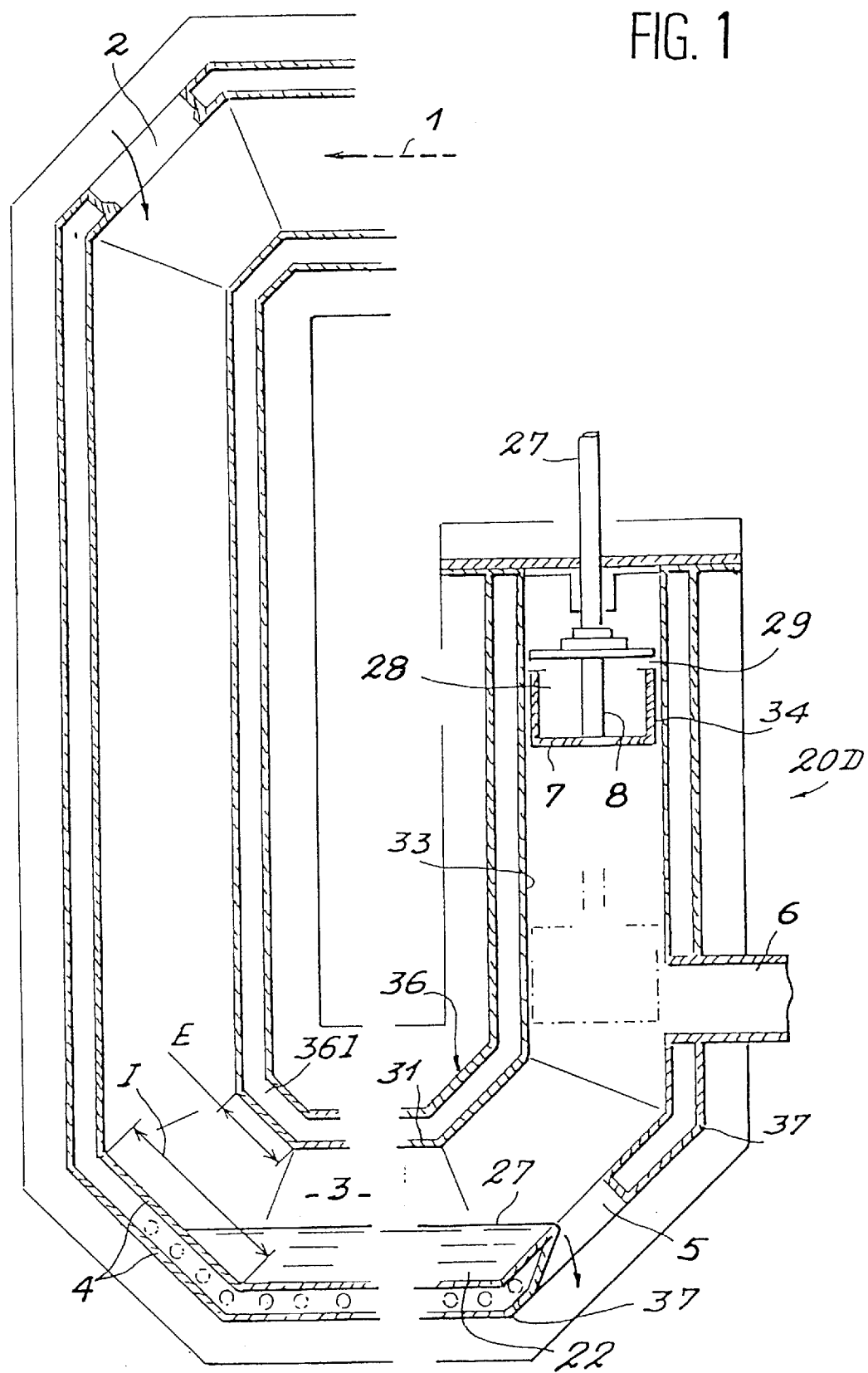
FIG. 1, already described, shows an oven according to the prior art.
Figure 2:
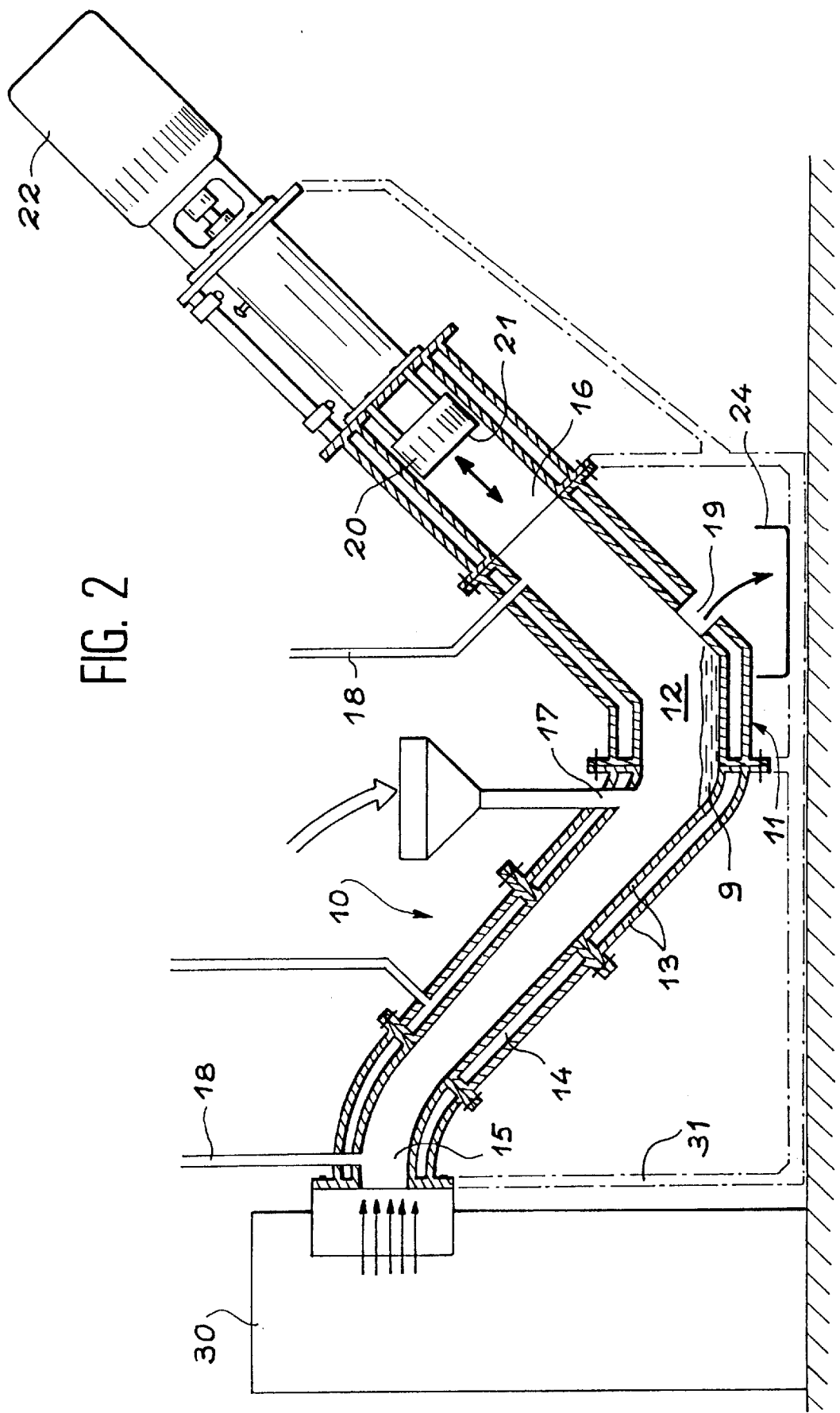
FIG. 2, already described, shows the main embodiment of the oven of the invention.

With reference to FIG. 2, the body 10 of the oven of the invention is formed of a V-shaped tube. The lower portion of the V constitutes a tank 11 delimiting a relatively high internal space 12 so that a melting bath 9 can be formed there and its surface is clearly located below the upper wall of this space 12. Placed at the inlet 15 of this body 10 is a microwave generator 30 which emits inside the body 10 a wave with a specific frequency, namely 915 MHz. Located at the extremity 16 opposite the body 10 is a reflecting surface 21 which in this case in the face of a piston 20 mounted sliding inside this extremity 16 of the body 10.

An inlet 17 for the materials is provided at the surroundings of the tank 11. These materials are melted by the microwaves in the form of a melting bath 9. An outlet for the molten materials 19 is provided at the level of the surface of the melting bath 9. These materials can therefore be continuously poured out into a recovery tank 24 placed below this molten materials outlet 19. At least one gas outlet duct 18 is preferably provided in the upper portions of the body 10. This body is secured to a rigid frame 31 laid on the ground.

As specified previously, the piston 20 is driven with a slow alternative movement inside the extremity 16 of the body 10. The motor means for moving this piston 20 are embodied in this case with the aid of an electric motor driving a screw/nut system (not shown on the figure). Thus, as indicated by the arrow positioned at the side of the piston 20, the latter is driven by an alternative translation movement over several centimeters. Now, the reflecting surface 21 of the piston 20 constitutes an obligatory electric node and an obligatory magnetic antinode for the stationary wave created by the reflection of the wave emitted by the microwave generator 30 inside the body 10. As a result, the antinodes and nodes of the stationary wave shall all be moved into the body 10 according to the movement of the reflection surface 21 of the piston 20 by an equivalent distance.

For a frequency of 915 MHz, a strong field (antinode) being separated from a weak field by a distance $$\frac{\lambda g}{4},$$

for example 9 cm, it can be understood that if the alternative movement of the piston 20 exceeds $$\frac{\lambda g}{4},$$

then all the points of the melting bath g shall be scanned by a strong field (antinode). Thus, a heat homogenization of the melting bath 9 is carried out. However, for higher frequencies, it ought to be added that as this distance is shorter, the method and oven of the invention function extremely well, especially for frequencies between 300 MHz and 3 GHz.

Figure 3:
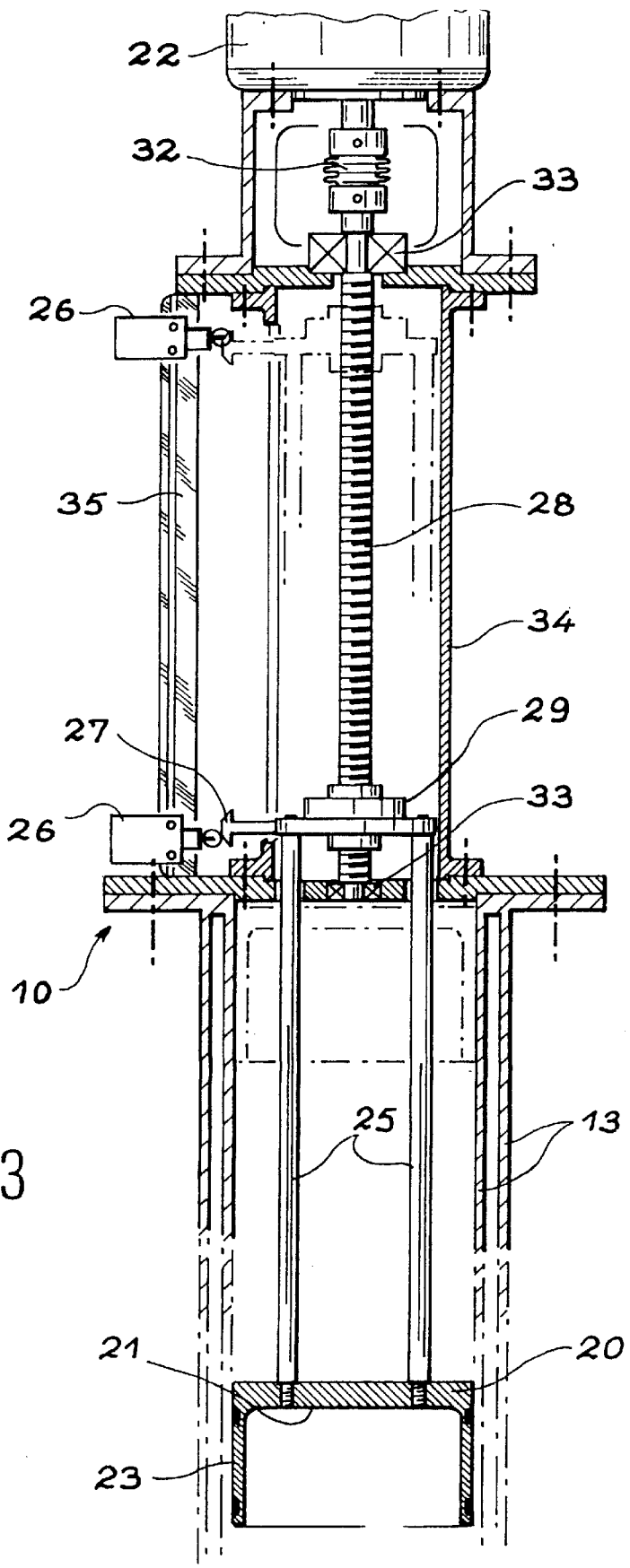
FIG. 3 shows a portion of the oven of FIG. 2.

FIG. 3 shows in detail the motor means which provoke the oscillation of the piston 20 of FIG. 2. The energy is provided by a variable speed gear 22, that is the association of an electric motor and a speed modulation control system, driving in rotation a threaded rod 28. This rod is kept rotating with the aid of two bearings 33 inside a sheath 34 placed in the extension of the double wall 13 of the tube. It is possible to use a flexible coupling 32 between the variable speed gear 32 and the threaded rod 28.

A nut 29 is mounted via threading around the threaded rod 28. It is kept in its position on rotation with respect to the axis of the threaded rod 28 with the aid of two bars 25 fixed to the piston 20. Now, as the latter has a rectangular section and placed inside the tube with a rectangular section, the bars 25 keep the nut 29 in its position. As this is mounted by threading on the threaded rod 28, when the latter rotates, the nut 29 moves along the horizontal axis of the threaded rod 28 and drives in the same alternative movement described previously the piston 20 inside the double wall 13 of the tube.

Adjustment of the movement can be ensured by two switches 26 placed at the extremities of the envisaged travel of the nut 29, the latter carrying one contact portion 27 intended to activate the two end of travel switches 26 so as to control the variable speed gear 22, that is to provoke an inversion of the direction of rotation of the threaded rod 28.

In the embodiment drawn on FIG. 3, the piston 20 is hollow, that is having a bush 23. This bush facilitates guiding of the piston 20 inside the double wall 13 of the body. It is possible to place the end of travel switches 26 so as to be adjustable on a meter rule 35 so as to thus adjust the amplitude of the oscillations of the piston 20.

It is thus possible to make the piston traverse an alternate translation travel of 25 cm, this piston moving at speeds of between 0 and 40 cm/s.

With the device of the invention, it is possible to obtain a flowrate of 8 to 10 kg of molten glass with a uniform temperature of about 1100° C. by dissipating 15 kW in the melting bath.

It is possible to envisage other means than the piston 20 to provoke variation of the position of the antinodes and nodes with a monomodal phenomenon with stationary waves without departing from the context of the present invention.

What is claimed is:

1. Melting method by means of microwaves for vitrifying materials in a body including:

a lower portion constituting a melting tank;

an inlet for the materials;

an outlet for the molten materials and placed at the desired height of the melting bath;

at least one gas outlet, and an inlet for the microwaves so as to continuously melt the materials by an incident wave created by a microwave generator and a reflected stationary wave above the melting bath by a reflecting surface placed in the body opposite the microwave generator, wherein with the wave being monomodal, the position of the reflecting surface is made to continuously vary so as to constantly vary melting the position of the antinodes of the reflected stationary wave and thus homogenize the temperature for the entire melting bath.

2. Method according to claim 1, wherein the frequency of the microwaves is between 300 MHz and 3 GHz.

3. Method according to claim 1, wherein the frequency of the microwaves is about 915 MHz.

4. Microwave melting oven for vitrifying materials including:

a body including a lower portion constituting a melting tank having a constant section over the largest possible length;

a inlet for the materials;

an outlet for the molten materials and placed at the desired height of the surface of the melting bath;

at least one gas outlet;

a microwave inlet;

a microwave reflecting surface situated on the side opposite that of the microwave inlet, and a microwave generator placed opposite the microwave inlet, wherein it includes motor means to continuously vary the distance separating the microwave inlet and the reflecting surface melting and thus constantly vary the position of the antinodes of the stationary wave on the surface of the melting bath.

5. Oven according to claim 4, the reflecting surface being a sliding mounted piston, wherein the motor means are formed of means to alternatively and continuously move the piston.

6. Oven according to claim 5, wherein the body and piston both have a rectangular section and the motor means include:

an electric motor;

a threaded rod driven in rotation by the electric motor;

a nut mounted by threading on the threaded rod, and two bars connected to the nut and the piston.

7. Oven according to claim 5, wherein the motor means include:

two end of travel switches on the body at the start and end of travel;

a contact portion integral with the nut and placed projecting so as to activate the two end of travel switches and thus control the alternative movement of the piston.

8. Oven according to claim 4, wherein the microwave generator has a system for damping the reflected wave.

* * * * *

UNITED STATES PATENT AND TRADEMARK OFFICE
CERTIFICATE OF CORRECTION

PATENT NO. : 5,822,879
DATED : October 20, 1998
INVENTOR(S) : Vincent et al.

It is certified that error appears in the above-identified patent and that said Letters Patent is hereby corrected as shown below:

On the title page, item [73], Line 2
   delete "General" and insert --Generale--.

Column 2, Line 29, delete "C./cm" and insert --C/cm--.

Column 5, Line 25, Claim 1, after "vary" insert
   --during melting--.

Column 6, Line 12, Claim 4, after "surface" insert
--during--.

Signed and Sealed this

Thirtieth Day of March, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO.   : 5,822,879
DATED        : October 20, 1998
INVENTOR(S)  : Vincent et al.

It is certified that error appears in the above-indentified patent and that said Letters Patent is hereby corrected as shown below:

On the title page, item [73] assignee
　　delete "General" and insert --Generale--.

Column 5, Line 25, Claim 1, after "vary" insert
　　--during melting--.

Column 5, Line 26, Claim 1, delete "melting".

Signed and Sealed this

Eighth Day of June, 1999

Attest:

Q. TODD DICKINSON

*Attesting Officer*　　　　Acting Commissioner of Patents and Trademarks